United States Patent [19]

Fisher et al.

[11] Patent Number: 4,742,948
[45] Date of Patent: May 10, 1988

[54] BONDING OF CARBON-BASED COMPONENTS

[75] Inventors: Ronald Fisher, Rugby; Thomas G. Fennell, Coventry, both of United Kingdom

[73] Assignee: Dunlop Limited, United Kingdom

[21] Appl. No.: 795,884

[22] Filed: Nov. 7, 1985

[30] Foreign Application Priority Data

Nov. 16, 1984 [GB] United Kingdom ............... 8428953

[51] Int. Cl.$^4$ .................... B23K 31/00; F16D 69/00
[52] U.S. Cl. .................................. 228/119; 228/121; 188/251 A
[58] Field of Search ....................... 228/119, 121; 188/251 A, 251 M

[56] References Cited

U.S. PATENT DOCUMENTS

| | | | |
|---|---|---|---|
| 2,979,814 | 4/1961 | Steinberg | 29/470 |
| 3,293,012 | 12/1966 | Smiley et al. | 228/121 X |
| 3,439,858 | 4/1969 | Ando et al. | 228/121 X |
| 3,800,392 | 4/1974 | Cook et al. | 29/402.06 |
| 3,934,686 | 1/1976 | Stimson et al. | 188/215 A |
| 3,946,932 | 3/1976 | Peterson | 228/121 |
| 3,956,548 | 5/1976 | Kovac et al. | 188/251 A X |
| 3,966,029 | 6/1976 | Spain | 188/251 A X |
| 4,002,225 | 1/1977 | Marin | 188/251 A X |
| 4,187,932 | 2/1980 | Zarembka | 188/251 M X |

FOREIGN PATENT DOCUMENTS

| | | |
|---|---|---|
| 651216 | 9/1937 | Fed. Rep. of Germany ... 188/251 A |
| 745121 | 2/1956 | United Kingdom . |
| 841716 | 7/1960 | United Kingdom . |
| 865592 | 4/1961 | United Kingdom . |
| 1162098 | 8/1969 | United Kingdom . |
| 1290645 | 9/1972 | United Kingdom . |

OTHER PUBLICATIONS

Dunlop Aviation Division Newsletter, vol. 1, No. 5, May 1984, 3 pages.
Stimson, I. L. et al., "Design and Engineering of Carbon Brakes", Phil. Trans. R. Soc. Lond., vol. 294, pp. 583–590, 1980.

*Primary Examiner*—Fred Silverberg
*Assistant Examiner*—Carmine Cuda
*Attorney, Agent, or Firm*—Stevens, Davis, Miller & Mosher

[57] ABSTRACT

A carbon-carbon composite friction disc is formed from two or more carbon-based structural components secured together by an interface layer which is not itself a structural member but is fusion-bonded to both of the structural components to secure them together. The interface layer may be of metallic material such as a brazing compound, or may be of non-metallic material such as pitch.

15 Claims, 2 Drawing Sheets

BONDING OF CARBON-BASED COMPONENTS

This invention relates to the bonding of carbon-based components of friction discs for brakes or clutches, and particularly to friction discs of carbon-carbon composite material.

Aircraft brake discs may be made from carbon-carbon composite material in which layers of carbon fibre cloth are bonded in a dense matrix of carbon which may be deposited by various means to build up the composite structure. One method of depositing the carbon matrix is by chemical vapour deposition of carbon from hydro-carbon gases on to a carbon fibre substrate in a vacuum furnace at high temperature. Another method is by charring organic substances such as resins which have been infiltrated into a carbon fibre mass. In either case the process for manufacture of a brake disc is lengthy and expensive and it is therefore highly desirable that some means should be found for repairing brake discs which may have been worn or damaged in service.

One object of the invention is to provide a method for bonding two pieces of carbon together, suitable for use in the very difficult environment of a carbon brake which in operation is subject to high temperature and high thermal shock conditions.

It has been proposed, for example in U.S. Pat. No. 3,800,392, to provide thin 'wear plates' of carbon or graphite material for one or both sides of a carbon core disc so that after wear of the core disc wear plates may be secured to reground faces of the core disc. Metal clips or rivets are proposed for securing such core discs and wear plates together, but such means can cause failure by melting or distortion of the metal fasteners in the adverse thermal environment of a carbon brake, and since such a clip or rivet only secures the carbon components in the area immediately adjacent the clip or rivet, areas not immediately adjacent such a localized fastening are free to distort, again leading to failure.

It had been thought that there was no means other than metal clips or rivets by which carbon brake disc, or parts of carbon brake discs, could successfully be secured together, bearing in mind the need to withstand temperatures of up to 1000° C. in normal service braked landing runs.

However, we have discovered that it is possible in the manufacture of a composite friction disc to bond carbon surfaces together with a high-melting point fusible metallic or non-metallic non-structural interface layer, yielding a joint which is capable of withstanding very high temperatures and thermal shock.

According to the invention, a carbon-carbon composite friction disc comprises two or more carbon-based structural components secured together by a non-structural interface layer which is fusion-bonded to both of the carbon-based structural components.

According to the invention also, a method of bonding together two or more carbon-based structural components of a friction disc comprises fusing a non-structural interface layer to bond the interface layer to both of the carbon-based components.

The description of the interface layer as "non-structural" is intended to mean that the thickness of the interface layer is insufficient to provide any significant structural stiffness of itself, only being required to secure together the carbon components which provide the necessary stiffness and strength in the finished disc. The interface layer thus acts as an adhesive.

In one example, two worn carbon-carbon composite friction discs may each be ground to slightly more than half the normal designed thickness of such a friction disc, and the two half-discs secured together by a fusion-bonded interface layer of a high-melting-point alloy.

In another example, a carbon-carbon composite friction disc may comprise a separately-made carbon-carbon composite block, for example a drive key, bonded into a previously prepared notch in the disc by means of a fusion-bonded interface layer of a high-melting point alloy.

Two embodiments of the invention will now be described, with reference to the accompanying drawings, in which.

Figure 1:
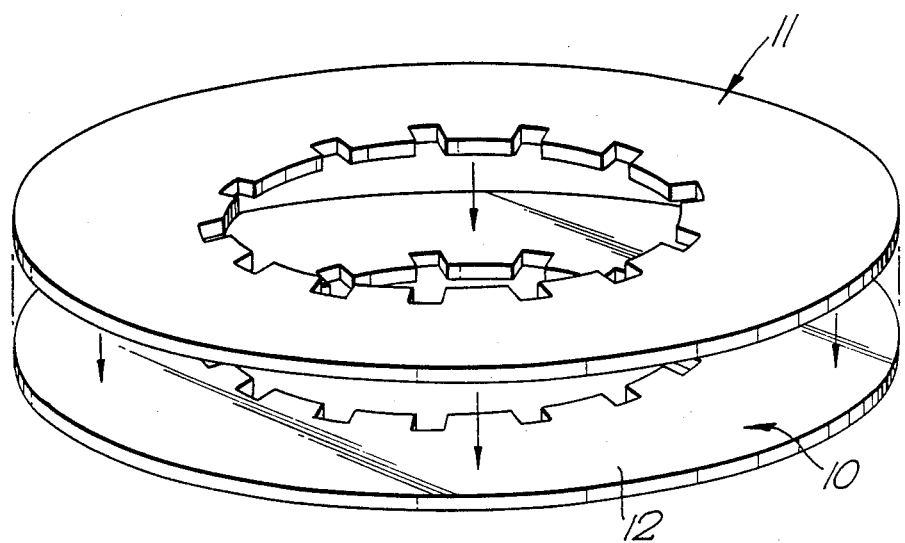
FIG. 1 is a perspective view of two half-thickness carbon-carbon composite discs made from fully-worn aircraft stator discs.

The stator discs 10 and 11 shown in FIG. 1 are of carbon-carbon composite material and in accordance with the invention are each of slightly greater thickness (in the axial direction of the disc) than half that of an unworn disc in an aircraft disc brake. The discs 10 and 11 are in fact produced by grinding discs which have already completed a normal service life in an aircraft brake and have been worn beyond the permissible tolerance. Any metal clips which may be fitted to the discs to protect the drive notch areas are removed before grinding.

Ground-flat opposing faces of the discs 10 and 11 (only face 12 of the disc 10 is visible in the drawing) are painted to a thickness of 0.2–0.30 millimeters with a paste consisting of a high-melting point powdered alloy brazing compound. The compound (Example 1) known as NICROBRAZ 180 (Trade Mark), produced by Wall Colmonoy has a formulation as follows:

EXAMPLE 1

|           | %       |
|-----------|---------|
| Chromium  | 5.0     |
| Boron     | 1.8     |
| Silicon   | 3.0     |
| Iron      | 1.0     |
| Carbon    | 0.25    |
| Nickel    | Balance |

The discs 10 and 11 are positioned one on top of the other with the NICROBRAZ 180 (Trade Mark) layer 13 between them. The discs are located precisely to align the drive slots 14 of the respective discs and are heated in a vacuum furnace at a vacuum better than $10^{-3}$ millimeters of mercury to 1200° C. with a clamping pressure of 0.2 to 0.3 MegaNewtons per square meter holding the discs together.

Figure 2:
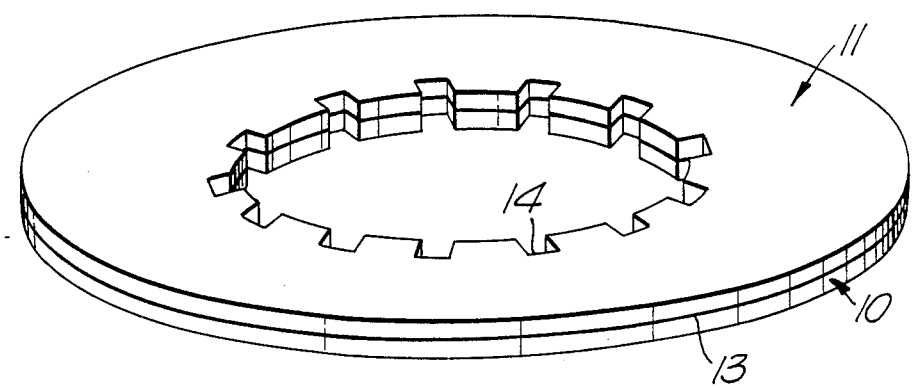
FIG. 2 shows the half-thickness discs of FIG. 1 bonded together to form a full-thickness stator disc.

The discs are held for 30 minutes under clamping pressure while being cooled in an inert gas such as Nitrogen and are then removed from the furnace. Excess metal is removed from the edges and the completed composite disc as shown in FIG. 2 is finally machined down to the required thickness, and new metal clips are fitted where necessary to reinforce the drive areas in the conventional manner.

On radiographic examination it has been found that a better than 75% coverage of the disc area in the interface region with the alloy has been achieved by the above method, and that a strong bond has been made between the metal interface layer 13 and the two carbon-carbon composite disc components 10 and 11. Thermal conductivity measurements have shown such discs to have a conductivity close to that of the original discs, and dynamometer tests have indicated that their performance in an aircraft disc brake is similar to that of the original discs.

Other examples of brazing compounds have been investigated, as follows. The same vacuum and clamping pressures were used as those for Example 1 above.

EXAMPLE 2

|  |  | % |
|---|---|---|
| NICROBRAZ 30 | Chromium | 19.0 |
|  | Silicon | 10.2 |
|  | Carbon | 0.10 |
|  | Nickel | Balance |

In this example the heating was for 30 minutes in the range 1190°–1200° C. (the brazing range of the compound being 1150°–1205° C.).

EXAMPLE 3

|  |  | % |
|---|---|---|
| NICROBRAZ 150 | Chromium | 15 |
|  | Boron | 3.5 |
|  | Nickel | Balance |

In this example the heating was for 30 minutes in the range 1165°–1185° C. (preferred temperature 1175° C., the brazing range of the compound being 1065°–1205° C.).

EXAMPLE 4

|  |  | % |
|---|---|---|
| NICROBRAZ 160 | Chromium | 11.0 |
|  | Boron | 2.25 |
|  | Silicon | 3.5 |
|  | Iron | 3.5 |
|  | Carbon | 0.5 |
|  | Nickel | Balance |

In this example the heating was for 30 minutes in the range 1150°–1205° C. (preferred temperature 1190° C.).

EXAMPLE 5

|  |  | % |
|---|---|---|
| COLMONOY No. 5 | Chromium | 11.5 |
|  | Iron | 4.25 |
|  | Silicon | 3.75 |
|  | Boron | 2.5 |
|  | Carbon | 0.65 |

-continued

|  |  | % |
|---|---|---|
|  | Nickel | Balance |

In this example the heating was for 30 minutes in the range 1065°–1220° C. (preferred temperature 1190° C.).

Interlaminar shear strength testing of the products of examples 1–5 gave strengths in excess of the parent material strength, failure occurring in the parent (disc) material rather than in the interface layer.

While in the examples described above metallic brazing compounds are used to form the non-structural interface layer, other metallic materials such as powdered nickel in a suitable binder can be used, and it is also possible to use a non-metallic non-structural interface layer such as pitch, e.g. to bond together two component discs. The process for incorporating a layer of pitch to bond together two component discs is similar to that described above in relation to FIGS. 1 and 2 of the drawings, but the process can take place at a lower temperature as indicated in the following examples.

EXAMPLE 6

A binder pitch was used in powder form (particle size less than $710 \times 10^{-3}$ millimeter diameter) to form the interface layer, the assembly of discs being clamped with a clamping pressure of 1.4 MegaNewtons per square meter and heated slowly in vacuum better than $10^{-3}$ millimeters of mercury at a rate of temperature increase of approximately 5° C. per minute to a temperature of 600° C. The temperature of 600° C. was then held for 10–20 minutes and was then raised to 1100° C. and held for 30 minutes.

Interlaminar shear strength testing of the product of example 6 gave results somewhat lower than parent material strengths.

EXAMPLE 7

The residue remaining after extraction from pitch of materials soluble in n-heptane and benzene was used as the bonding medium for the interface layer.

The bonding medium was used:
(a) as a dry powder
(b) combined with a liquid cement of the L B P 500 R type (supplied by Wall Colmonoy)
(c) as a paste made by adding a small quantity (less than 5%) of benzene.

In each of cases (a), (b) and (c), the method used for bonding was as described for example 6.

Interlaminar shear strength testing of the products of examples 7(a), (b) and (c) gave results approaching the strength levels of the parent material. Failure occurred along the bond/parent material interface.

Figure 3:
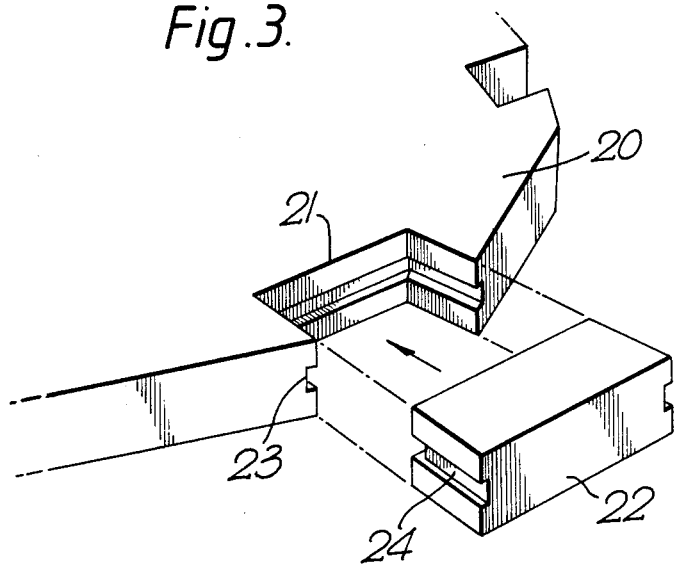
FIG. 3 is a perspective view of part of an aircraft disc brake rotor disc of carbon-carbon composite material, together with a separately made carbon-carbon composite block to be secured to the rotor disc in a previously prepared notch.
Figure 4:
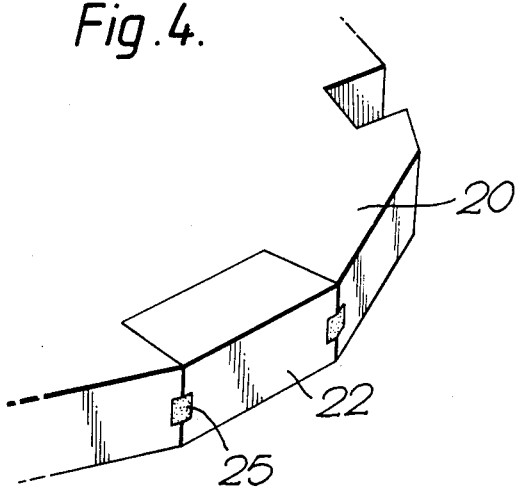
FIG. 4 shows the disc of FIG. 3 having the block bonded in position in the notch.

In FIGS. 3 and 4 the method in accordance with the invention is shown in application to the repair of a damaged area in a rotor disc 20. A notch 21 is cut into the disc to eliminate the damaged area, and a block 22 of similar size is cut, for example from a scrap disc, to fit into the notch 21. The notch 21 and the block 22 are grooved as indicated at 23 and 24 to contain a brazing paste as described above, brazing paste is applied to the whole of the mating areas of the notch 21 and block 22, and the block 22 and disc 20 are assembled together and heated under conditions of pressure in a suitable jig and surrounding vacuum to bond the components together as previously described. FIG. 4 shows the state of the repaired disc after bonding, the metallic interface component forming a fillet 25 in the mating grooves 23, 24 of the block 22 and notch 21. The repaired part of the disc may then be further machined, e.g. by cutting a drive notch in the repaired area.

The invention provides great advantages in that the unexpectedly successful application of metal brazing techniques to bonding carbon-carbon composite structures makes it economically feasible to repair and refurbish worn-down brake discs and thus to make full use of this inherently expensive material.

One way in which the technique according to the invention may be used is to provide a carbon-carbon composite core disc to which is bonded a pair of thin 'wear discs', one to each side, which may be replaced with new wear discs when they become worn.

Another application, involving repair of an existing disc, is separately to form an entire carbon-carbon composite drive dog or notch area and to bond it in position by the technique illustrated in FIGS. 3 and 4.

We claim:

1. A carbon-carbon composite friction disc comprising two or more carbon-carbon composite structural components secured together by a non-structural interface layer of metallic brazing which is fusion-bonded to both of the carbon-carbon composite structural components by pressure and heat only within the brazing range of the brazing material.

2. A friction disc according to claim 1, constituting a brake disc for an aircraft brake.

3. A carbon-carbon composite friction disc according to claim 1 in which said metallic brazing material is, prior to bonding, a paste of a high melting point powdered alloy brazing compound.

4. The disc of claim 3 in which the paste comprises powdered nickel.

5. The disc of claim 3 in which the paste comprises powdered nickel and chromium.

6. The disc of claim 3 in which the paste comprises powdered nickel and chromium and boron.

7. The disc of claim 3 in which the paste comprises powdered nickel and at least one other powdered metal.

8. A carbon-carbon composite friction disc comprising a sandwich of two carbon-carbon composite structural components, at least one of which is a worn or damaged brake friction disc upon which at least one face has been trued,
said components being secured together face to face to form a replacement disc, said securing being only by means of a non-structural interface layer of metallic brazing material which is fusion-bonded to both of the structural components by pressure and heat only within the brazing range of the brazing material.

9. A method for manufacture of a carbon-carbon composite friction disc from worn parts comprising:
machining the worn face of at least one used carbon-carbon composite friction disc to present at least one face surface for mating with another face surface of another carbon-carbon composite friction disc;
applying a layer of high melting point metallic brazing compound between said faces of said friction discs;
clamping the discs together in face-to-face relationship and
heating the discs in a vacuum furnace to a temperature within the brazing range of said metallic brazing compound.

10. The method of claim 9 including two discs, one of which is a new disc.

11. The method of claim 9 including two used discs, both of which are machined on their worn faces.

12. The method of claim 9 including three discs, at least one of which is a new disc.

13. A carbon-carbon friction disc produced by the method of claim 9.

14. A method of bonding together two or more carbon-carbon composite structural components of a friction disc comprising applying a layer of high melting point brazing compound between the components, clamping the components together and heating the components in a suitable atmosphere to melt the brazing compound, cooling the components and removing the resulting composite disc from the clamping.

15. A carbon-carbon friction disc produced by the method of claim 14.

* * * * *